United States Patent

[11] 3,618,003

| [72] | Inventor | Arthur N. Marshall<br>5501 Kingsbury Road, Richmond, Va. 23226 |
|---|---|---|
| [21] | Appl. No. | 714,214 |
| [22] | Filed | Mar. 19, 1968 |
| [45] | Patented | Nov. 2, 1971 |

[54] VEHICLE INTERVAL DETECTION AND SIGNALING SYSTEM
10 Claims, 12 Drawing Figs.

[52] U.S. Cl. .................................................. 340/31, 324/70
[51] Int. Cl. ................................................. G08g 1/09
[50] Field of Search ..................................... 340/38 L, 38, 31, 36

[56] References Cited
UNITED STATES PATENTS

| 2,325,435 | 7/1943 | Sykora ........................ | 340/31 |
| 3,384,869 | 5/1968 | Waldron ...................... | 340/36 |
| 3,414,876 | 12/1968 | Cress ........................... | 340/36 |
| 3,430,221 | 2/1969 | Barringer .................... | 340/38 L |

*Primary Examiner*—Thomas B. Habecker
*Attorney*—Wynne and Finken

ABSTRACT: An output from an appropriate detector that senses the presence of a vehicle at a given point in a traffic lane activates a timed conditioning means which maintains one part of a coincident logic arrangement enabled for a predetermined fixed period of time after the vehicle has passed the given point. Another output from the detector indicating the arrival of another vehicle at the given point within the fixed period established by the conditioning means fully enables the coincident logic arrangement which then actuates a warning signal to caution the motorist in the following vehicle that the interval is unsafe or actuates an appropriate recorder, such as a camera, for identifying the vehicle and recording the event.

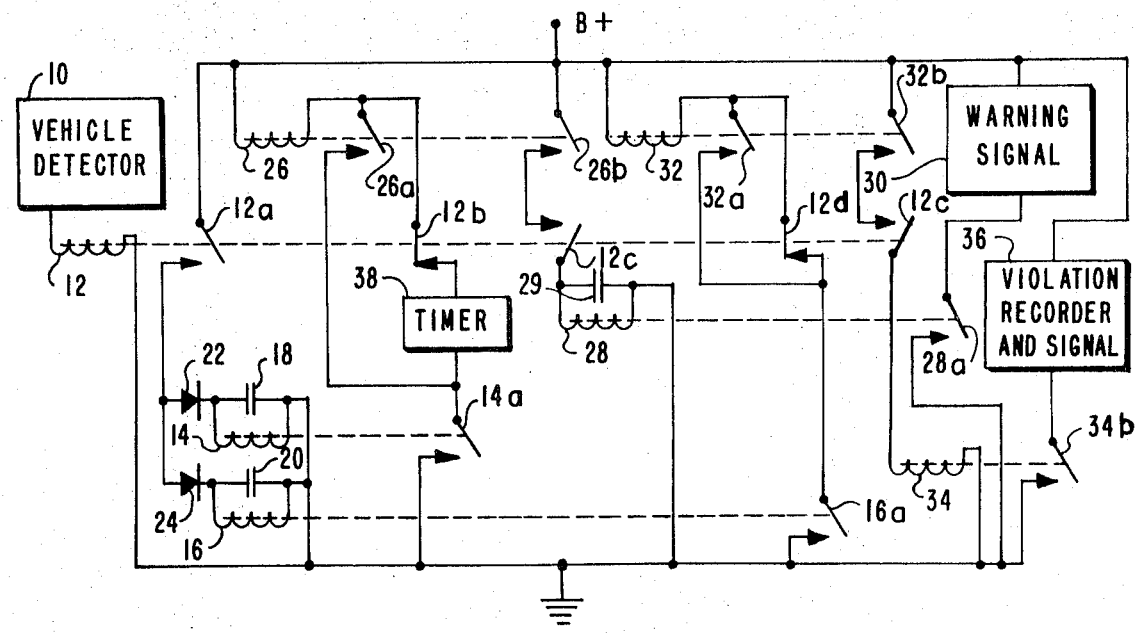
FIG.—1
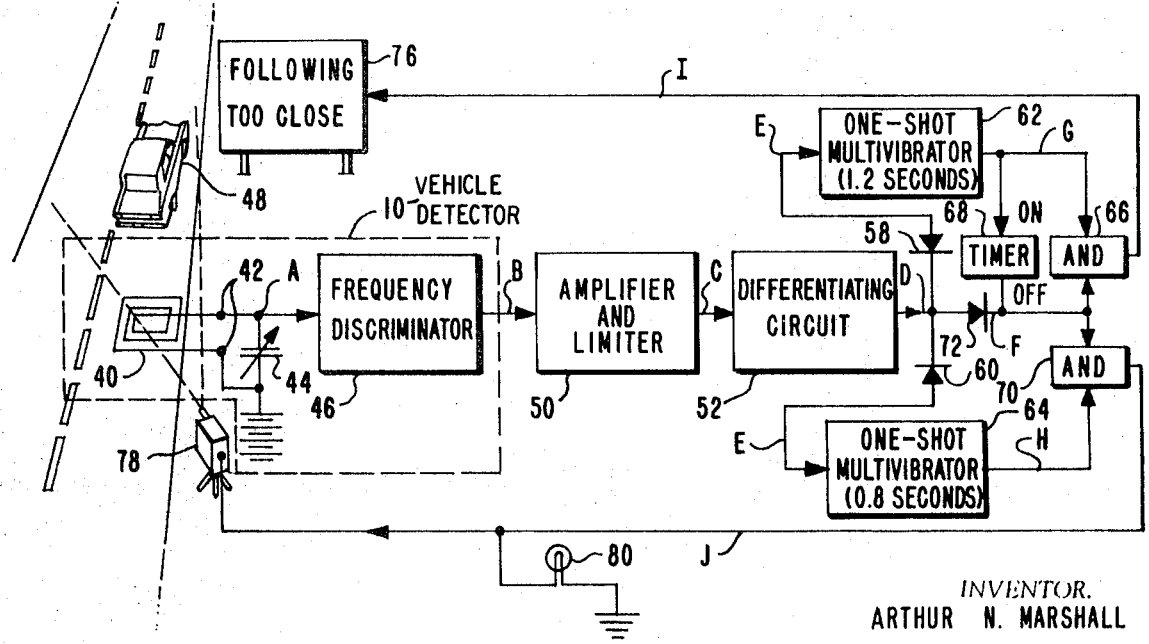
FIG.—2

3,618,003

VEHICLE INTERVAL DETECTION AND SIGNALING SYSTEM

BACKGROUND OF THE INVENTION

One of the most serious causes of automobile accidents results from the practice of following the vehicle ahead too closely, commonly known as "tailgating." This practice is one of the primary causes of traffic accidents, particularly on limited access highways and freeways where dangers of cross traffic are virtually eliminated. For safety a motorist must maintain a sufficient distance interval between the front of his own vehicle and the rear of the vehicle ahead to permit full mental and physical reaction to a sudden or unexpected braking. Although the reaction speed of individual motorists may vary with the individual's age, coordination and alertness, traffic safety authorities generally agree as to what constitutes a standard safe interval between vehicles. This distance varies directly with the vehicle speed, and is most often expressed as an interval of one car length for each 10 miles per hour of speed. Such distances are sometimes difficult for the motorist to approximate, and frequently drivers travelling at high speeds on highways tend to misjudge both their own speed and their distance from the vehicle ahead.

BRIEF DESCRIPTION

This invention provides a relatively simple system for sensing potentially unsafe traffic conditions caused by vehicles following one another too closely, and for warning the offending motorist or recording and indicating violations of law where the condition is wholly unsafe. In accordance with the invention, an appropriate vehicle detector, such as the kind employing an inductance coil buried in the roadway, senses the presence of each vehicle passing a selected point to generate a detector output that is preferably continuous during the time required for the vehicle to pass the selected point. This output is applied to activate a conditioning device or circuit that remains activated for a fixed period of time equal to an established safe reaction time interval after cessation of the detector output. The conditioning circuit during this time partially enables a coincident logic arrangement which is fully enabled only if another detector output is generated during this fixed period, indicating the arrival of another vehicle at the selected point before expiration of the established safe reaction interval. The fully enabled coincident logic arrangement can be coupled to operate an appropriate warning signal to caution the offending motorist, or to alert an arresting officer and photograph or otherwise record the identity of the offending vehicle and the offense.

In the preferred form, two separate conditioning circuits are provided. One remains activated for a period corresponding to a recommended or average safe reaction interval and the other for a shorter period equal to a selected minimum safe reaction interval. Each conditioning circuit partially enables a respective coincident logic arrangement for the respective time period. When a following vehicle is detected during the longer period, one of the coincident logic arrangements is fully enabled to operate a warning signal to caution the motorist, whereas when it occurs during the shorter interval, the other coincident logic arrangement is fully enabled to alert a police officer to make an arrest or to indicate and record the offense and identify the offender.

BRIEF DESCRIPTION OF THE DRAWINGS

FIG. 1 is a schematic illustration, partially in block diagram form, of a preferred form of the invention employing solenoid switching circuits;

FIG. 2 illustrates in block diagram form another preferred form of the invention using electronic circuitry; and, FIGS. 3a–3j show typical signal waveform diagrams plotted on a common horizontal time scale to explain the operation of the electronic circuitry of FIG. 2.

DETAILED DESCRIPTION

Figure 3:
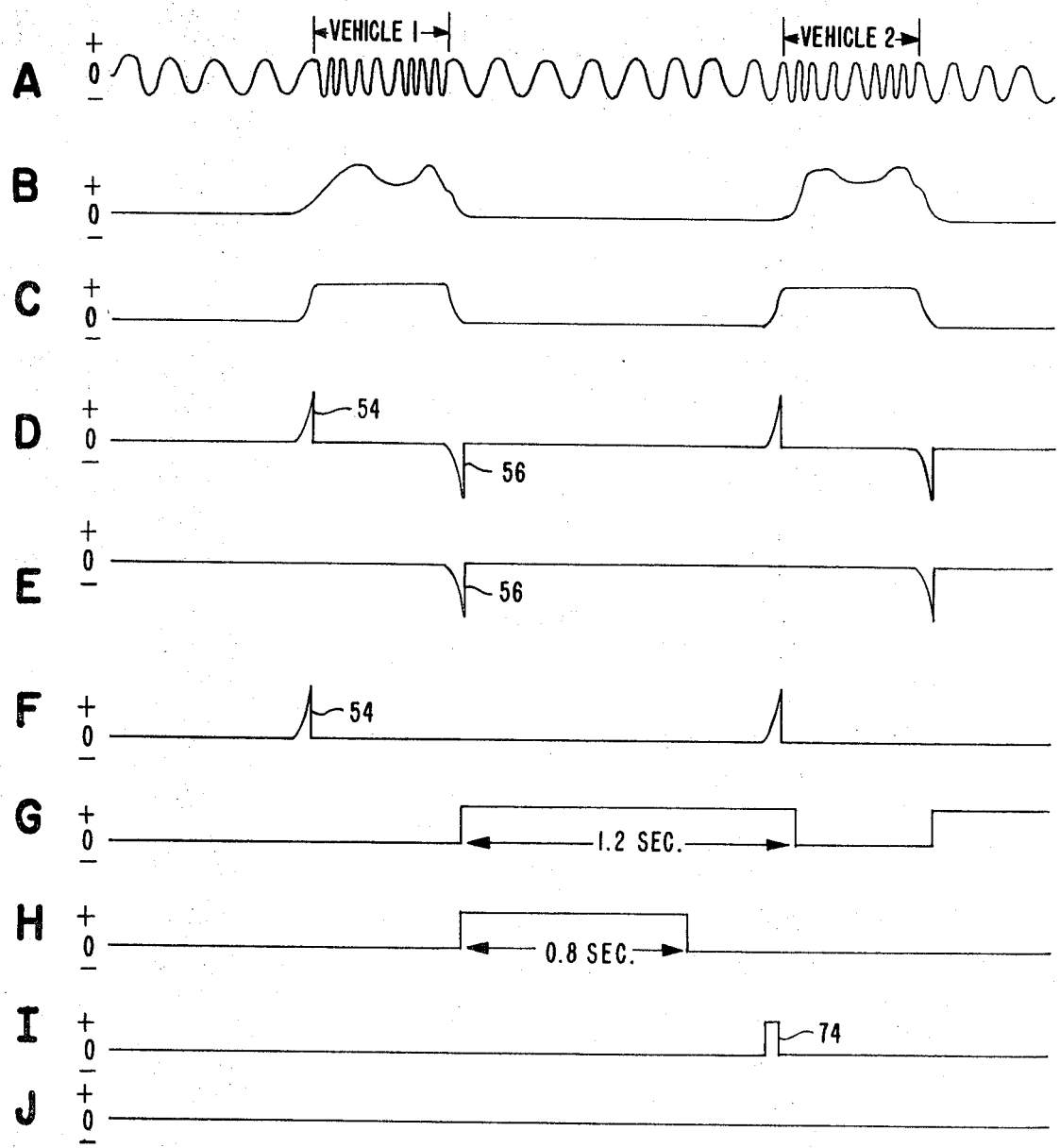

Referring now to FIG. 1, a vehicle detector 10 senses the presence of a vehicle at a given point along a traffic lane. Preferably, the vehicle detector 10 should be of the type which provides a continuous output during the entire interval required for the vehicle to pass a given point. Various types of detectors can be used for this purpose, including those operating on optical, radar, ultrasonic and capacitive principles. However, generally vehicle detectors of the type employing inductance coil sensors placed on or embedded in the roadway are probably best suited for this purpose, as described in connection with FIG. 2, and have the advantages of relative simplicity and low cost. As the front of the vehicle reaches the selected point in the roadway, the vehicle detector 10 delivers an actuating current flow through the solenoid coil 12 which continues uninterrupted until the rear of the vehicle has passed over the selected point. The solenoid when actuated operates five associated switches 12a, 12b, 12c, 12d and 12e, closing the normally open switches 12a, 12c, and 12e to permit current flow while opening the normally closed switches 12b and 12d during the entire period that the actuating output current flows through the coil 12. When the rear of the vehicle has passed the selected point, the actuating current from the vehicle detector 10 stops, returning switches 12a, 12c and 12e to their normally open position and switches 12b and 12d to their normally closed position.

The normally open switch 12a is connected in a series circuit between a B+ power supply and a pair of parallel connected time delay solenoid coils 14 and 16. Capacitors 18 and 20 are connected in parallel with the solenoid coils 14 and 16, respectively to maintain the solenoids activated during the time periods selected. As the normally open switch 12a closes, current from the B+ supply flows through the forward connected diodes 22 and 24 to actuate the solenoid coils 14 and 16, respectively, and at the same time charge the associated capacitors 18 and 20. When the switch 12a subsequently opens after the vehicle passes, the charge stored in the capacitors 18 and 20 is discharged through the respective solenoid coils 14 and 16 to maintain an actuating current flow for the selected fixed time period, which is determined by the size of the capacitor relative to the inductance of the associated coil. The diodes 22 and 24 prevent reverse flow from the discharging capacitors 18 and 20. In the particular embodiment illustrated, the capacitors 18 and 20 are selected to maintain the flow of actuating current through the solenoid coil 14 for a substantially longer time interval than for the solenoid coil 16. The longer interval can be made equal to a recommenced safe interval equal to a recommended average or maximum response time, while the delay interval for the solenoid coil 16 can be made equal to a minimum reaction interval indicative of a wholly unsafe tailgating condition amounting to a violation.

The flow of actuating current through solenoid coil 14 closes normally open switch 14a that is connected in series with the normally closed switch 12b and a solenoid coil 26 across the B+ supply. Flow of actuating current through the solenoid coil 26 closes two associated normally open switches 26a and 26b. The normally open switch 14a is in series with the coil 26 and normally open switch 14a and parallels the normally closed switch 12b, and thus serves to maintain the actuating current flow through the coil 26 as long as switch 14a is closed, even though the normally closed switch 12b is opened by the passage of another vehicle. Thus, as a first vehicle reaches the selected point, the switch 14a is closed, but the normally closed switch contacts 12b is held open until the vehicle has passed. When the flow of actuating current from the vehicle detector 10 through the solenoid coil 12 ceases, indicating that the rear of the vehicle has passed the selected point, the normally closed switch 12b is released and closes to initiate current flow through the solenoid coil 26 and the normally open switch contact 14a that is being held closed by the continued activation of the solenoid coil 14. The actuated solenoid closes normally open switch contacts 26a to establish the conductive path through coil 26 as long as the switch contacts 14a remained closed. This arrangement is thus a conditioning circuit that maintains actuating current flow through the solenoid coil 26 for a fixed period of time after the rear of a vehicle has passed the selected point in the roadway. The actuated solenoid 26 closes normally open switch contacts 26b in series with normally open switch contacts 12c and a solenoid coil 28 across the B+ power supply. Thus, if the switch 12c is closed by the arrival of a vehicle at the selected point during the time period that the switch 26b remains closed due to the passage of a previous vehicle, actuating current flows through the coincident series connection of the switches to actuate the solenoid coil 28, which then closes normally open switch 28a to operate an appropriate warning signal 30 to caution the motorist in the following vehicle for following too closely. The solenoid 28 may be maintained actuated for a short period by means of a parallel coupled capacitor 29 to operate the warning signal for a desired interval until the motorist has passed.

A similar conditioning circuit is operated over the shorter of the fixed intervals in accordance with the flow of actuating current through the solenoid coil 16. The associated normally open switch contact 16a is in series with the flow of actuating current through the solenoid coil 16. The associated normally open switch contact 16a is in series with the normally closed switch 12d and a solenoid coil 32 that controls the normally open switches 32a and 32b. The normally open switch 32a is in parallel with normally closed switch 12d to maintain the solenoid 32 actuated beginning with the closure of the normally closed switch 12d upon passage of the vehicle and continuing for the selected time period that the normally open switch 16a remains closed. The normally open switch 32b is connected in series with the normally open switch 12c and a solenoid coil 34. Thus, if switch 12c closes due to arrival of a vehicle during the selected time period that the switch 32b is closed, current through the solenoid coil 34 closes normally open switch 34b to actuate a violation recorder or signal 36. As shown in the drawing, the degree of the violation or unsafe condition, if desired, may be determined by inserting a current actuated clock timer device 38 in series with the switch 12b. As the switch 12b is released to close after passage of a vehicle, the timer starts and continues until the switch 12b is opened by the arrival of another vehicle or at the end of the selected time period during which the switch 14a is closed, thus indicating the time value of the shorter interval between two vehicles.

Referring now to FIG. 2, an improved form of the invention employs simple electronic circuits instead of the solenoid switching circuit shown in FIG. 1. The vehicle detector 10, the basic components of which are shown within the dotted lines, consists of an inductive coil 40 disposed on or actually embedded in the roadway at the center of a selected traffic lane. The inductive coil 40 has a plurality of turns of insulated conductive wire in a flat configuration so that the sensitive coil axis is normal to the roadway surface. Such coils may be embedded at point along the roadway at selected intervals with leads extending from the coil to a pair of remote terminals 42 that can be connected to the remaining circuitry whenever it is desired to monitor traffic at one of these points. Also, the coil may be disposed in a protective mat that can be laid on the roadway at any desired point. As is generally the case with this type of vehicle detector, the coil 40 is connected in parallel with a capacitor 44 to form a tank circuit, the frequency of which is determined by the inductance of the coil 40 and the capacitance of the capacitor 44. The capacitor 44 is variable and can be adjusted to select a resonant oscillation frequency for the tank circuit in the absence of any vehicles which matches the center or null frequency of a frequency discriminator 46, since the inductance of a particular coil may vary depending on the magnetic properties of the roadway materials and the surrounding environment. When the resonant frequency of the tank circuit in the absence of a vehicle equals the center frequency of the frequency discriminator 46, the oscillations applied to the frequency discriminator 46 produce no output. As a vehicle 48 travelling along the roadway reaches the coil 40, the metal body, and particularly the undercarriage and driving elements that are relatively close to the roadway, are intersected by the flux produced along the coil axis. The low magnetic reluctance of these metal parts lowers the inductance of the coil 40, thus changing the resonant frequency of the tank circuit. The increased frequency of the tank circuit oscillations, as shown in waveform A of FIG. 3, during the period required for the vehicle 48 to pass over the coil 40, produces a corresponding increase in the amplitude of the output signal from the frequency discriminator 46, as shown in waveform B of FIG. 3. The output waveform produced is generally of irregular shape due to the fact that axles and portions of the drive train on most vehicles pass closer to the roadway surface, thus having better inductive coupling to produce peak output levels. Similar output waveforms are obtained from other types of vehicle-sensing arrangements which are suitable for use in the context of this invention. However, induction coil sensors are particularly useful since they tend to produce a continuous detector signal output even during passage of vehicles such as tandem trailer rigs in which there are slight separations between trailers.

The vehicle detector output signal is applied to an amplifier and limiter circuit 50 which increases the magnitude of the output to a suitable level and limits the positive excursion of this signal to a selected voltage level so that the waveform remains substantially constant after the initial rise until the fall at the end, as shown in waveform C of FIG. 3. Eliminating voltage variations in the signal as the vehicle passes over the selected point provides a pulse-type signal, the leading edge of which marks the arrival of the front of a vehicle at the selected point and the trailing edge of which marks the passage of the back of the vehicle. This pulse is applied to a differentiating circuit 52 that generates a positive going voltage spike 54 in response to the leading edge and a negative voltage spike 56 in response to the trailing edge as shown in waveform D. The negative voltage spikes indicating the passage of the rear of each vehicle are passed by the reverse connected diodes 58 and 60, as shown by waveform E of FIG. 3, to the input of a pair of one-shot multivibrators 62 and 64. Each negative spike triggers the multivibrator circuits 62 and 64, turning them on to generate a signal pulse for different preselected time periods, after which each cuts off unless another negative spike has been received. The one-shot multivibrator 62, whose output pulse is shown in waveform G, generates a pulse over a relatively long interval, in this case approximately 1.2 seconds which corresponds to a recommended safe reaction time interval. On the other hand, the one-shot multivibrator 64 has an output pulse interval that is substantially less, for example, approximately 0.8 seconds, which corresponds to a minimum reaction time interval which, if not maintained, would constitute a wholly unsafe condition amounting to a violation of law.

The output from the one-shot multivibrator 62 is applied to one input of a coincident AND circuit 66 and also to turn on an appropriate clock timer device 68, if desired. The output from the one-shot multivibrator 64 is likewise applied to one input of another coincident AND circuit 70. The other input to each of the AND circuits 66 and 70 receives the positive voltage spikes 54 produced by the differentiating circuit 52 which are passed by a forward connected diode 72. Thus, if a positive voltage spike 54 indicating the arrival of a vehicle at the selected point occurs during the interval that timing pulse from the multivibrator 62 is being generated, the simultaneous application of the signals on both inputs of the AND circuits 66 causes it to generate an output pulse 74, as shown in waveform I, which for example may be used to initiate a momentary illumination of a sign 76 located adjacent the roadway or other appropriate signaling means for warning the motorist that he is following too closely. On the other hand, if a positive spike 54 occurs during the shorter pulse interval of the multivibrator 64, the coincidence of the signals on both inputs to the AND circuit 70 results in generation of an output pulse that may be used for triggering a movie or a still camera 78 located adjacent the roadway that photographically records the violation and identifies the offending vehicle. Also, an output pulse from the AND circuit 70 may be used to trigger an indicator light 80 or a buzzer or the like to notify officers that a violation has occurred for which an arrest should be made. If desired, where the offense is photographed, the photograph might be made to include an image of an indicator face on the timer 68 so that the exact interval sensed between the vehicles is likewise recorded for later use.

The electronic arrangement illustrated in FIG. 2 additionally permits modified operation under certain traffic conditions where tailgating conditions must unavoidably occur. During peak traffic hours, particularly on metropolitan thruways and freeways, traffic may be moving very slowly and vehicles frequently become unavoidably bunched together as a result of periodic slowdowns and accelerations that produce an accordion effect which is a common characteristic of heavy traffic. In this regard, it is noted that the amplitude of the voltage spikes 54 and 56 produced at the output of the differentiating circuit 52 would be proportional to the rate of change of frequency produced by the passing vehicle, which is in turn directly proportional to the speed of the vehicle. Thus, where the vehicles move slowly in heavy traffic, the amplitude of the spikes is significantly less than that produced by vehicles moving at higher normal speeds. By employing a one-shot multivibrator circuit which is made sensitive to triggering pulses with amplitudes only above a selected minimum voltage level, the operation of the system might effectively be suspended for vehicles travelling below a given speed.

The systems in accordance with this invention are thus capable of detecting one vehicle following another at an unsafe distance without the necessity of measuring the distance between vehicles or their speed, and without regard to the size of the individual vehicles. These systems merely compare the time interval that elapses between the passage of the rear of one vehicle and the arrival of the front of another at a given point with the standard time period needed for a motorist to react properly to an unexpected situation.

It should be understood that the particular forms of the invention illustrated and described herein constitute preferred embodiments of the invention, and that various changes may be made in the element, design and operation of the system, without departing It should be understood that the particular forms of the invention illustrated and described herein constitute preferred embodiments of the invention, and that various changes may be made in the element, design and operation of the system, without departing from the spirit or scope of the invention as set forth in the appended claims.

What is claimed is:

1. A system for detecting and indicating that the interval between successive vehicles travelling along a roadway in a common traffic lane is less than a predetermined safe interval, comprising:

vehicle-detector means responsive to the presence of a vehicle at a given point along said traffic lane for producing an output during passage of each vehicle;

coincidence means having first and second inputs for producing a coincidence signal when both inputs are actuated simultaneously;

conditioning means responsive to the output from said detector means for actuating said first input for a predetermined time period after the cessation of each said output and for actuating said second input upon the initiation of each said output; and, means responsive to the coincidence signal produced by said coincidence means for indicating that the interval between successive vehicles in said traffic lane is less than a predetermined safe interval.

2. The system of claim 1 wherein:

said vehicle-detector means includes means for providing a continuous output signal during the presence of a vehicle at said given point;

said conditioning means includes first circuit means responsive to the cessation of said output signal for actuating said first input for the predetermined time period and second circuit means responsive to the initiation of said output signal for actuating said other of said inputs; and, said first and second inputs constitute first and second switching circuits coupled to produce a coincidence signal when both of said switching circuits are actuated.

3. The system of claim 2 wherein:

said first and second switching circuits constitute first and second serially connected normally open switch contacts each of which is closed when actuated to establish a current flow;

said first circuit means constitutes a first solenoid control circuit responsive to the cessation of said output for closing said first switch contacts for said predetermined time period;

said second circuit means constitute a second solenoid control means responsive to said output for closing said second switching means during the occurrence of said second output; and, said means responsive to the coincidence signal constitutes an electrical signal and actuating means connected in series circuit with said first and second switching means and responsive to said current flow for actuating said signal.

4. The system of claim 1 wherein:

said vehicle-detector means provides a continuous output signal during passage of each vehicle;

said coincidence means constitutes a logical AND circuit having first and second inputs, each capable of being selectively enabled for producing a coincidence signal only when both inputs are enabled simultaneously;

said conditioning means comprises an amplitude limiter circuit responsive to the output signal from said detector means for generating a constant amplitude output pulse during passage of each vehicle, differentiating means responsive to said pulse for generating short duration pulses of opposite polarity indicative of the leading and trailing edge of each said output pulse, a one-shot multivibrator circuit responsive to the short duration pulses of one polarity indicative of the end of each said output pulse for generating an enabling pulse for said predetermined time period and unidirectional circuit means for applying the short duration pulses of the other polarity to the second input of said coincidence means.

5. A system for detecting and indicating unsafe headway time intervals between vehicles traveling along the roadway in a common traffic lane, comprising:

vehicle-detector means responsive to the passage of a vehicle past a given point in said traffic lane for producing output signals indicative of the arrival of each vehicle at said given point and the departure of each vehicle from said given point;

means responsive to said departure output signal for generating a timing signal for a predetermined time period following the departure of each vehicle from said given point; and, means responsive to said timing signal and to a later arrival output signal from said vehicle-detector means for indicating an unsafe condition whenever an output signal is generated by said vehicle-detector means during generation of said timing signal.

6. The system of claim 5 wherein:

said vehicle-detector means includes an inductive sensing coil disposed at said given point having its sensitive axis normal to the path of vehicles in said traffic lane; and, circuit means coupled to said inductive sensing coil for detecting a change in the inductance of said coil caused by the presence of a vehicle at said given point to provide said output signal with an amplitude indicative of said change.

7. The system of claim 6 wherein:

said means for generating a timing signal constitutes a circuit selectively responsive to the cessation of said output signal for generating an actuating pulse having a duration equal to said predetermined time period; and, said signaling means includes a coincidence circuit having first and second inputs for providing a coincidence signal when said first and second inputs are actuated, said first input being coupled to be actuated by said timing signal and said second input being coupled to be selectively actuated by the initiation of said output signal from said vehicle-detector means, and means responsive to said coincidence signal for indicating the presence of an unsafe distance interval between vehicles.

8. A system for detecting the occurrence of unsafe headway time intervals between vehicles travelling along a roadway in a common traffic lane, comprising:

vehicle-detector means responsive to the passage of a vehicle past a given point in said traffic lane for producing an output signal indicative of the arrival of each vehicle at said given point and the departure of each vehicle from said given point;

first timing means responsive to said output for generating a timing signal for a first predetermined time period after the departure of said vehicle from said given point, said first predetermined time period being indicative of a recommended headway line interval between vehicles;

first signaling means responsive to said first timing signal and to said output signal from said vehicle-detector means for indicating a possible unsafe condition whenever an output signal indicative of the arrival of a vehicle is generated by said vehicle-detector means during generation of said first timing signal;

second timing means responsive to said output for generating a second timing signal for a second predetermined time period following the departure of each vehicle from said given point, said second predetermined time period being indicative of a predetermined unsafe headway time interval between vehicles; and, second signaling means responsive to said second timing signal and to said output signal from said vehicle-detector means for indicating said positive unsafe condition whenever an output signal indicative of the arrival of a vehicle is generated by said vehicle-detector means during generation of said second timing signal and including means responsive to the indication of said positive unsafe condition for recording the identity of the vehicle present at said given point.

9. A method for determining safe driving spacing between two successive moving vehicles comprising:

signaling the passage of the rear of the leading vehicle past a given point, signaling the passage of the point of the trailing vehicle past said given point, establishing in response to the signaling of the passage of said rear a predetermined time interval following said passage of said rear, and identifying whether the passage of said front occurs within said predetermined time interval.

10. An apparatus for determining safe driving spacing between two successive moving vehicles comprising:

means for generating a signal indicating the passage of the rear of the leading vehicle past a given point, means for generating a signal indicating the passage of the front of the trailing vehicle past said given point, means for establishing in response to the signal identifying the passage of said rear a predetermined time interval following said passage of said rear, and means for indicating whether the passage of said front occurs within said predetermined time interval.

* * * * *

UNITED STATES PATENT OFFICE
CERTIFICATE OF CORRECTION

Patent No. 3,618,003          Dated November 2, 1971

Inventor(s) Arthur N. Marshall

It is certified that error appears in the above-identified patent and that said Letters Patent are hereby corrected as shown below:

| | |
|---|---|
| Col. 2, line 61 | "14a is in series" is changed to -- 26a is in series -- |
| Col. 3, lines 24-26 | "with the flow of actuating current through the solenoid coil 16. The associated normally open switch contact 16a is in series" has been cancelled |
| Col. 3, line 59 | "point" is changed to --- points |
| Col. 5, line 47 | after "departing" has been added -- from the spirit or scope of the invention as set forth in the appended claims.-- |
| Col. 5, lines 48-53 | "It should....appended claims." has been cancelled. |
| Col. 6, Claim 3, line 21 | "constitute" has been changed to -- constitutes -- |
| Col. 8, Claim 9, line 17 | "point" has been changed to -- front -- |

Signed and sealed this 6th day of June 1972.

(SEAL)
Attest:

EDWARD M. FLETCHER, JR.           ROBERT GOTTSCHALK
Attesting Officer          Commissioner of Patents